No. 648,395. Patented May 1, 1900.
G. K. DAVOL.
VEHICLE WHEEL.
(Application filed Sept. 2, 1899.)
(No Model.) 3 Sheets—Sheet 2.
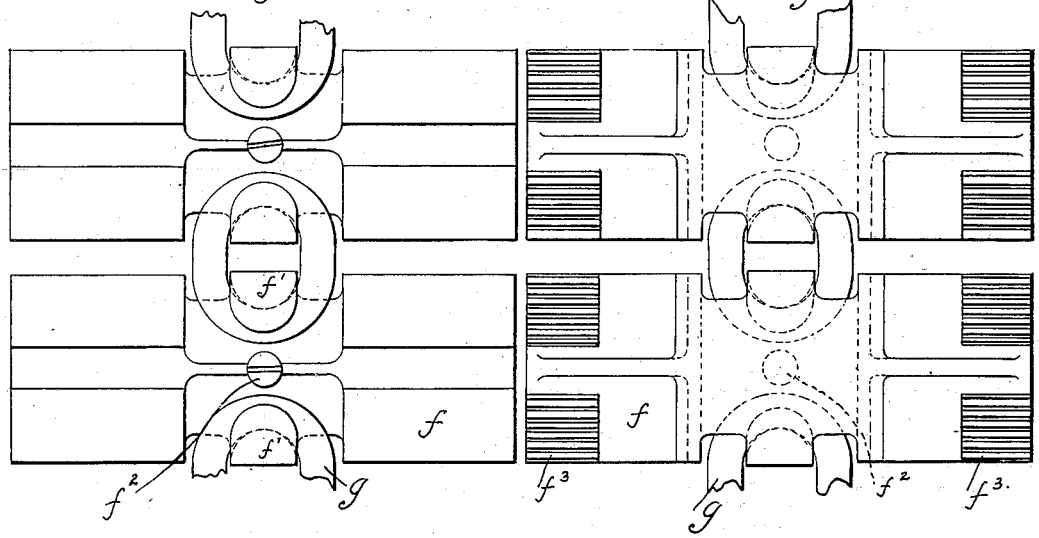
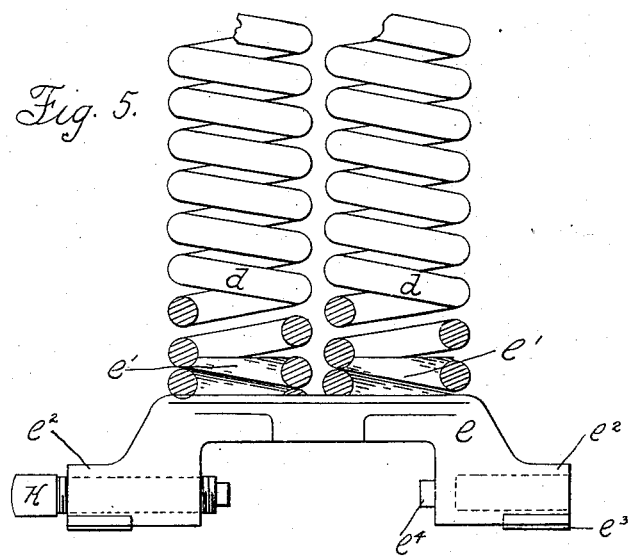
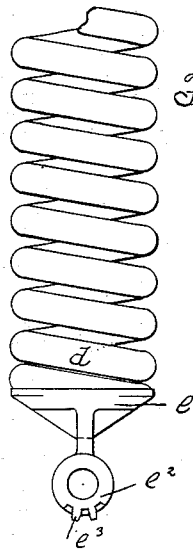
Witnesses:
Inventor:
George K. Davol,
By Charles R. Brown & Cragg
Attorneys.

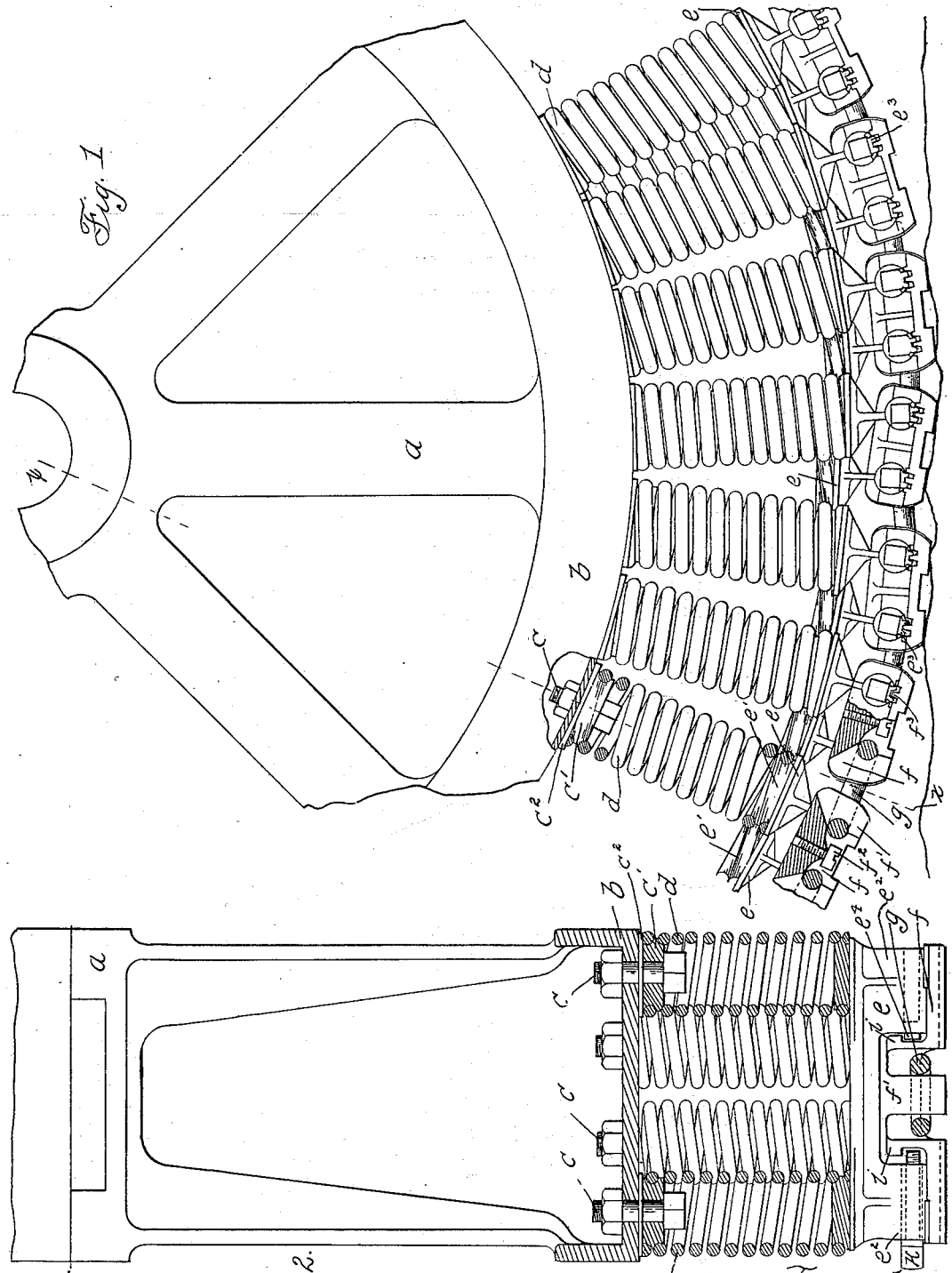

No. 648,395. Patented May 1, 1900.
G. K. DAVOL.
VEHICLE WHEEL.
(Application filed Sept. 2, 1899.)
(No Model.) 3 Sheets—Sheet 3.

Witnesses:
Max Label.
C. A. Nuertt.

Inventor:
George K. Davol,
By Charles A. Brown & Cragg
Attorneys.

THE NORRIS PETERS CO., PHOTO-LITHO., WASHINGTON, D. C.

UNITED STATES PATENT OFFICE.

GEORGE K. DAVOL, OF CHICAGO, ILLINOIS.

VEHICLE-WHEEL.

SPECIFICATION forming part of Letters Patent No. 648,395, dated May 1, 1900.

Application filed September 2, 1899. Serial No. 729,316. (No model.)

*To all whom it may concern:*

Be it known that I, GEORGE K. DAVOL, a citizen of the United States, residing at Chicago, in the county of Cook and State of Illinois, have invented a certain new and useful Improvement in Vehicle-Wheels, (Case No. 1,) of which the following is a full, clear, concise, and exact description, reference being had to the accompanying drawings, forming a part of this specification.

My invention relates to an improvement in vehicle-wheels; and its object is to provide a spring-wheel for vehicles which shall be strong, afford great tractive power, and which shall have a universally-flexible tread.

More particularly, the objects of my invention are, first, to construct a spring-wheel capable of sustaining heavy loads and one which will at the same time largely conform to the irregularities of the surfaces traveled over and relieve the vehicle and its load from jolting; second, to provide a wheel which shall when used for self-propelling vehicles be capable of exerting the required tractive force; third, to provide a wheel the tread of which shall be capable of resiliently yielding in a lateral direction, while at the same time possessing the required lateral stiffness, and fourth, to provide a wheel of the characteristics set forth which shall at the same time operate with very little noise.

The foregoing and other objects accomplished by the vehicle-wheel of my invention will be understood from the following description, in which reference is had to the accompanying drawings, forming a portion of this application.

Figure 7:
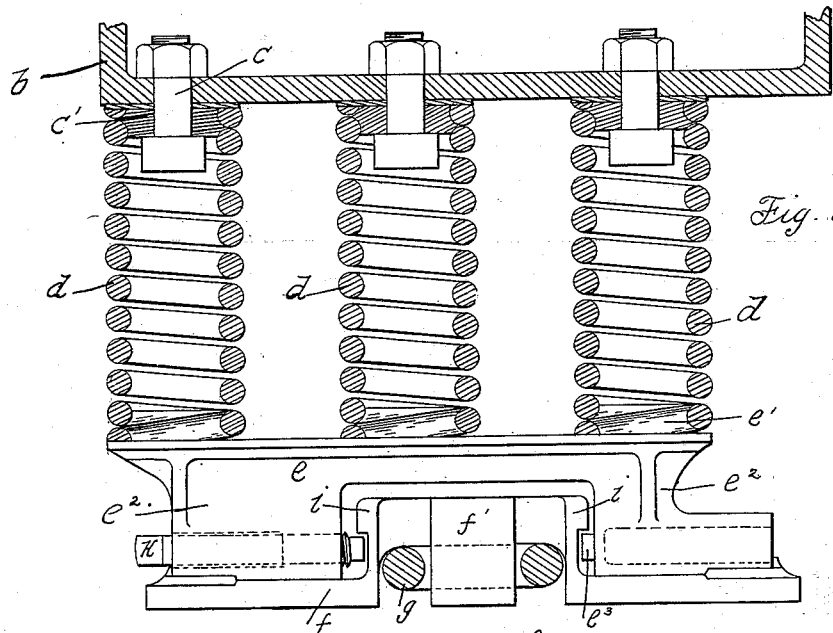
Figure 8:
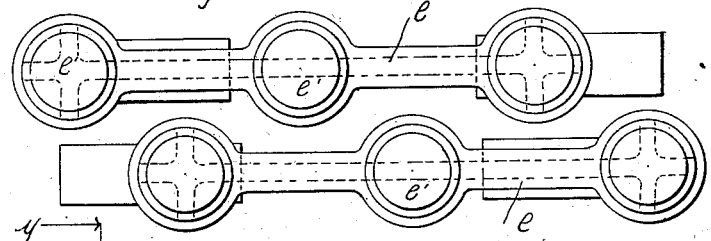
Figure 9:
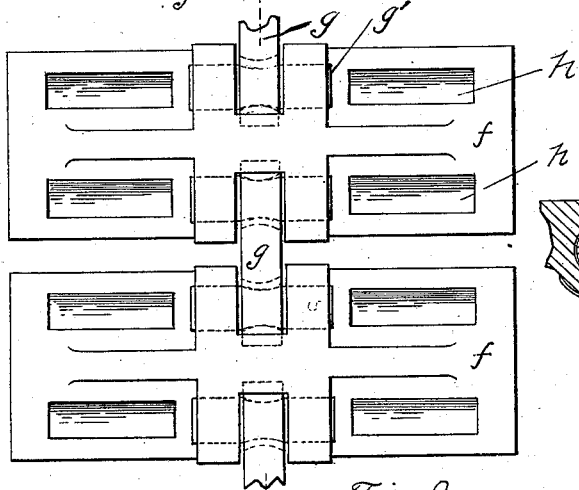
Figure 10:
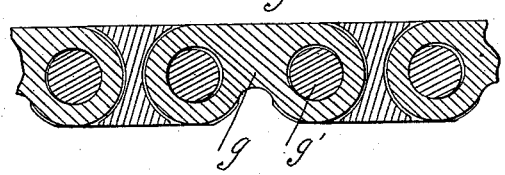

Figure 1 is a side view of a segment of the wheel of my invention, partly in section and showing the surface which the wheel is adapted to travel over. Fig. 2 is a section upon line $x\ x$ of Fig. 1. Fig. 3 is a view of the tread of the wheel looking toward the center. Fig. 4 is a view of the shoes constituting the outer rim of the wheel looking from the center of the wheel outward. Fig. 5 is a view in detail of one of the spring-feet. Fig. 6 is a view of part shown in Fig. 5, but at right angle thereto. Fig. 7 shows in detail three of the springs, together with one of the spring-feet and one of the shoes constituting the outer tread of the wheel. Fig. 8 shows the arrangement of the springs laterally when the modification shown in Fig. 7 is employed. Fig. 9 shows a modification of the means for connecting the spring-feet. Fig. 10 is a section of line $y\ y$ of Fig. 9.

Similar letters of reference are employed throughout the different views to indicate similar parts.

Briefly stated, the wheel consists of an inner rigid structure, around which are arranged a number of radially-disposed springs $d$, which bear through suitable spring-feet $e$ on an outer flexible tread, which tread is composed of a series of separate shoes $f$, flexibly connected to each other by means of links $g$.

The inner structure $a$ of the wheel is preferably made of cast-steel and may be constructed in any suitable and well-known way which will afford the necessary width of face to permit the attachment of the springs, which are interposed between the said inner structure and the outer flexible tread of the wheel. In the rim $b$ of this inner structure I provide holes for the passing of the bolts $c\ c\ c$, which hold against the outer face of the interior rim the circular spirally-grooved lugs or blocks $c'$. Between these spirally-grooved lugs or blocks and the rims are the washers $c^2$, having a flat surface against which the lug $c'$ presses and a concave surface conforming to the convexity of the rim. The lug $c'$ is constructed to receive in a spiral groove provided thereon the end of the spiral spring $d$ and is somewhat larger than the interior diameter of the spiral spring, so that when the spring is screwed upon the block or lug it grips it firmly and cannot be detached readily, because any attempt to unscrew it will be in a direction to reduce the diameter, and thus cause the spring to hug the block or lug more closely.

The springs $d\ d$ are placed, preferably, two or three in a transverse row across the face of the inner rim of the wheel. Attached to the outer ends of these springs are the spring-feet $e$, preferably one for each transverse row of springs. These spring-feet are provided with spirally-grooved blocks or lugs of a number sufficient to accommodate the springs, and to these blocks or lugs $e'$ are attached the springs in a manner similar to that described with reference to the attachment of the springs to the inner blocks or lugs $c'$.

The spring-feet $e$ I preferably construct of the bridge form shown in Fig. 5, with outwardly-extending bearings $e^2$ $e^2$, having the radial teeth $e^3$. (Shown most clearly in Figs. 1 and 6.) I prefer to allow two of the said spring-feet to have bearing on one shoe, thus having twice as many spring-feet as there are shoes. This permits the use of stronger shoes and connections and simplifies construction, while the wheel will run practically as evenly as if twice the number of shoes were used, as the evenness of running does not depend so much on the number of shoes used as it does on the number of transverse rows of springs and spring-feet. It would be practicable to allow more than two spring-feet to bear on the same shoe in certain designs or to use one shoe for each spring-foot; but I prefer to have two spring-feet bear on each shoe.

The shoes $f$ are coupled together by the links $g$ to form the outer flexible tread of the wheel. As the wheel is preferably constructed, this outer tread, formed by the shoes connected together by the links $g$, is of such length that when the wheel is lifted free from the ground the springs shall all be under a certain compression and all exerting an outward thrust against the shoes. This outward thrust is counteracted by the tension which it naturally produces in the endless chain of shoes and links constituting the outer flexible tread. When the wheel is free from the ground, this outer tread assumes under the action of the springs a circular shape. When the wheel is allowed to rest upon the ground and a load put upon it, this normally-circular shape of the outer tread is distorted by the compression of the springs bearing the weight of the wheel and load. If the wheel be resting upon a flat surface, the lower portion of the tread will be flattened to a greater or less extent, according to the load put upon it. Now it will be seen that when such a flattening occurs all the springs other than those bearing the weight of the wheel and the load will be relieved to some extent of their normal compression. By "normal compression" I mean that degree of compression which all the springs have when the wheel is lifted free from the ground. Therefore I preferably construct the wheel so that this normal compression of the springs will be of such degree that when the heaviest load is put upon the wheel and the greatest flattening of the lower part of the outer tread occurs those springs not bearing the weight of wheel and load will not be extended to their full extent, but will still have imposed upon them by the outer tread a slight degree of compression.

The outer tread of the wheel is preferably constructed to be always under some degree of tension, which is provided for by giving a proper degree of normal compression to the springs.

When the wheel is used for tractive purposes and a turning movement is applied to the center of the wheel against a resistance applied at the outer tread, the springs will naturally give to a certain extent. This resistance applied to the outer tread where it is in contact with the ground is transmitted to all the springs throughout the periphery of the wheel by the said tread. Thus all the springs throughout the entire periphery of the wheel taking this torsional strain, the wheel will be found to possess considerable stiffness against such strains.

The center of the flexible connections of the shoes is brought very near the actual tread of the wheel by the construction shown, while at the same time the necessary strength is afforded. I accomplish this by having the shoes $f$, which I preferably make of cast-steel, provided with hooks $f'$, with which the links are adapted to engage. The links are made of such size that when engaged with the hooks $f'$, there is a certain degree of play or clearance allowed, which permits a certain degree of freedom of motion in all directions. In other words, these links $g$, engaging with the hooks $f'$, form universally-flexible connections. Thus each shoe has a certain degree of movement independently of adjacent shoes. A certain clearance is allowed between each shoe, which clearance is sufficient to permit any link being removed by simply drawing the two shoes it connects together, when the link may be slipped off or on the hooks $f'$. To prevent, however, the links slipping off accidentally through any cause which might act to bring any two adjacent shoes together, the stops or screws $f^2$ are provided. These stops, which may be of any form desired, are so placed on the shoes that they form an obstruction, which must be removed before the links $g$ can be slipped off the hooks. It has been found that the links $g$ wear in use, which results in a gradual lengthening of the tread. The ease with which these links may be removed and replaced by others, however, permits ready means of adjusting the length of the tread and of compensating for such wear.

As there is a relative movement between the spring-feet and the shoes on which they bear, it is desirable to provide a form of bearing at this point which shall be as free from friction as possible. I therefore preferably provide the outer extremities of the spring-feet with cylindrical bearing-surfaces and provide suitable flat surfaces on the shoes on which the cylindrical surfaces of the spring-feet bear. Thus when any angular movement takes place between the shoes and spring-feet the bearing ends of the spring-feet will simply roll or rock on the flat surfaces on the shoes. To prevent the spring-feet sliding off the shoes or being displaced from their proper bearing, I provide teeth $e^3$, formed on one side of the cylindrical surface of the spring-feet, and teeth $f^3$ on one side of the flat surfaces of the shoes. These teeth mesh with each other and prevent any displacement of the spring-feet from their proper bearing on the shoes. These teeth are designed simply to prevent such displacement or sliding of the spring-feet and not to take any of the thrust which the spring-feet exert on the shoes, although they may be made to extend entirely across the entire bearing-surface between the spring-feet and the shoes and take the said thrust if desired. I prefer to form these teeth on one edge of the bearing-surfaces on the spring-feet and shoes, as shown, leaving the bearing-surface proper on the shoes smooth plane surfaces and on the spring-feet smooth cylindrical surfaces. Although I much prefer this form of bearing between spring-feet and shoes, it is not essential, as another form of bearing, as shown in Fig. 9, may be employed. In this form the outer extensions of the spring-feet have cylindrical bearing-surfaces, which fit into and rest in correspondingly-shaped recesses $h$, formed in the shoes. In this case a sliding action takes place between the spring-feet and the shoes in these bearings and a heavy lubricant is preferably used. The shoes, furthermore, are constructed to present to each other sides which are so curved that they preserve their normal separation from each other in all relative positions which they can assume, and this prevents the pinching of stones and other small objects between the shoes of the wheel in the course of its operation.

The constant compression of the springs, to a greater or less extent counteracted by the constant tension in the outer tread, will of course normally keep the shoes in place on the wheel. If, however, a break should occur in any of the links $g$, the shoes throughout the periphery of the wheel would drop off unless some additional means was provided to keep them in place. This I provide for as follows: In the center of each of the shoes there is a raised portion, necessitated by the hooks $f'$ and link connections $g$. On each side of this raised portion near the top the lips $i$ are formed. The spring-feet $e$ are formed to bridge or span this raised portion, their outwardly-projecting bearing parts $e^2$ coming down on each side thereof. On the inner side of one of the outwardly-projecting bearing parts $e^2$ of the spring-feet a teat or lug $e^4$ is formed, which when the spring-foot is in place comes under or inside of the lip $i$, formed on the shoe $f$. Similarly placed on the opposite side of the spring-foot is a screw $k$, having an inwardly-projecting end, which when the spring-foot is in place projects under or inside of the lip on its side of the shoe. Thus it will be seen that the shoe cannot be removed from the spring-foot, as the lug $e^4$ on one side and the screw $k$ on the other side will engage with the lips $i$, formed on the shoe.

In order to remove the shoe, it is necessary to withdraw the screw $k$ from one side, when the shoe may be slipped off. It is not only to guard against the dropping off of the shoes in case of a break in the links $g$ that this means of attachment is provided, but also to prevent the spring-feet being pulled away from the shoes when the wheel is subjected to any heavy tractional or torsional stresses. When such exceedingly heavy turning movements are applied at the wheel-center against resistance at the tread, these springs at the lower part of the wheel are deflected in a direction parallel to the plane of the wheel to a large extent, and if such turning movement be sufficiently great might be pulled off their bearing on the shoes were some such means of attachment not provided.

Upon each spring-foot instead of the links $g$ of the form shown in the other figures I may use the modification illustrated in Figs. 9 and 10, in which the shoes are coupled together by means of links $g$, provided with holes through which extend the coupling-pins $g'$. To increase the lateral stiffness of the wheel, a greater number of springs than two may be arranged in a transverse row on the same spring-foot. I have shown this modification in Figs. 7 and 8. When two springs in transverse rows are used, I preferably mount them, as shown in Fig. 2, with alternate wide and narrow spacing of the springs upon their spring-feet, in order to get more of the springs into a given space. When three springs or more are mounted in transverse rows, as shown in Figs. 7 and 8, I preferably stagger the springs in adjacent rows, as shown in Fig. 8. By increasing the number of springs in each row the capacity of the wheel may be increased to almost any desired amount.

It is desirable to get as great a number of transverse rows and corresponding spring-feet on the periphery of the wheel as possible, as the greater the number of transverse rows of springs the more smoothly the wheel will run.

As a considerable length of tread is always in contact with the ground, it is necessary in order to facilitate the turning of bends that the tread and springs be capable of yielding in a lateral direction, which will enable the shoes to be laid upon the ground in a laterally-curved line corresponding to the direction taken by the wheel. This lateral yielding is, however, limited by the lateral stiffness of the springs, but is sufficient to enable the wheel to readily travel in a curved direction or turn bends with ease.

The increase of width of the tread is unobjectionable, because it is made of independently-moving sections, and the increased width of these sections or shoes does not interpose any additional resistance to turning bends, as each shoe falls on the ground parallel to the axis of the wheel and independent of adjacent shoes, and in turning any ordinary bend will maintain the same position on the ground until the weight is taken off it. The construction of the tread is such that each shoe adapts itself to the irregularities of the ground and has at least three points of bearing upon the ground.

The form of connections used in this wheel to join the shoes forming the tread I have described herein as being universally flexible. I will point out more expressly the range and nature of flexure which the form of connections I use is designed to allow and the nature of the independent movements which are so permitted to the shoes. An ordinary "universal joint," as used to transmit rotary motion between two turning spindles or shafts, permits a certain range of independent deflection or variation of position to the shafts so connected, but allows no independent turning or torsional movement. The form of connection I use to join the shoes in the tread of of my wheel is designed not only to allow such flexures in all directions, but also is designed to be flexible as regards turning or twisting movements, thus permitting the center lines of any two adjacent shoes to lie in different planes. Thus the independent movements permitted each separate shoe in the tread of my wheel are the same as those allowed if the shoes were connected by perfectly-flexible cords, which would not only permit deflection in all directions, but independent turning, twisting, or torsional movements as well to the shoes so connected. In the form of connections shown in Figs. 1, 2, 3, 4, and 7 a large range of torsional or twisting movement or flexibility is allowed, and in the modified form shown in Figs. 9 and 10 this same twisting flexibility is allowed for by providing the clearance around the links *g* and in the holes in the links *g*. The object of allowing this torsional or twisting flexibility in the connections is to permit one shoe resting on the ground to be tipped up by the unevenness of the ground, while its adjacent shoe, also resting on the ground, may lie in a different plane, thus allowing to each shoe the requisite independence of movement to permit it to conform to the irregularities of the road-surface. I have made provision in this wheel to permit it to turn bends with ease, while having a wide tread. It will be seen that owing to the perfectly-flexible nature of the single line of connections joining the shoes if the wheel be traveling in a circular direction the shoes in contact with the ground will lie with their center lines radiating from the center of the arc traveled by the wheel. In other words, the shoes bearing on the ground are not constrained to occupy parallel positions, but the flexible nature of the single line of connections and of the springs bearing on the shoes allows each shoe to adapt its position to the direction taken by the wheel when the shoe comes in contact with the ground.

It will be apparent to those skilled in the art that the various departures from the specific structure herein shown as embodying my invention may be made without failing to realize the spirit of my invention. I do not wish to be limited, therefore, to the precise structure shown and described; but,

Having thus described my invention with reference to an embodiment which I have found to be satisfactory and successful, what I claim as new, and desire to secure by Letters Patent, is—

1. A wheel having an endless flexible outer tread comprising a plurality of separate shoes or bearing-blocks adapted to bear directly upon the surface traveled over, said shoes being joined to each other by connections constructed to permit free flexure in all directions, an inner structure and a plurality of springs separate from said shoes interposed between said shoes and the said inner structure.

2. A wheel having an outer tread comprising a plurality of separate shoes or bearing-blocks adapted to bear independently and directly upon the surface traveled over and flexibly connected or linked together by connections constructed to permit free flexure in all directions, to form an endless chain or belt of constant length, an inner structure and a plurality of springs interposed between the said shoes and the said inner structure.

3. A wheel having an outer tread, comprising a plurality of separate shoes or bearing-blocks adapted to bear independently and directly upon the surface traveled over and flexibly connected or linked together by connections arranged in circumferential alinement with the shoes or bearing-blocks and constructed to permit free flexure in all directions, said connected shoes or bearing-blocks forming an endless chain or belt of constant length; an inner structure and a plurality of springs interposed between the said shoes and said inner structure.

4. A spring-wheel having an outer flexible tread comprising a plurality of separate shoes or bearing-blocks adapted to bear directly upon the surface traveled over, a single line or series of links or equivalent connecting means which flexibly join the said shoes or bearing-blocks one to another in such manner as to afford free flexure in all directions and to form together with the said shoes an endless chain or belt of constant length, an inner structure and a plurality of springs separate from said shoes and interposed between said shoes and said inner structure.

5. A spring-wheel comprising a plurality of springs arranged around an inner structure and exerting an outward pressure or tension against an endless chain of constant length which forms the tread of the wheel, said endless chain surrounding the outer extremities of said springs and embracing a series of separate bearing-blocks or shoes adapted to bear directly upon the surface traveled over and flexibly connected together by a single series of links or other connections arranged in circumferential alinement with the shoes and which permit free flexure in all directions.

6. A wheel having an outer tread comprising a plurality of shoes or bearing-blocks adapted to bear independently and directly upon the surface traveled over and flexibly connected or linked together to form an endless chain or belt of constant length by a single line of links or flexible connections uniting the said blocks or shoes, which connections freely permit flexure in all directions, an inner structure, a plurality of springs interposed between the said shoes and the said inner structure, feet, one or more for each shoe attached to said springs and bearing upon said shoes, substantially as described.

7. A spring-wheel having an outer flexible tread comprising a number of separate shoes or bearing-blocks adapted to bear directly upon the surface traveled over and joined one to another to form an endless chain or belt of constant length by a single line or series of connecting-links or other flexible connections allowing flexure in all directions, an inner structure, a plurality of springs separate from said tread and interposed between said shoes and said inner structure, and feet one or more for each shoe, attached to said springs and bearing upon said shoes, substantially as described.

8. A spring-wheel comprising a plurality of springs arranged around an inner structure and exerting an outward pressure or tension against an endless chain of constant length which forms the tread of the wheel, said endless chain surrounding the outer extremities of said springs and being composed of a series of separate bearing blocks or shoes flexibly connected together by a single line or series of links or other flexible connections which freely permit flexure in all directions, and feet, one or more for each shoe, attached to said springs and bearing upon said shoes, substantially as described.

9. In a wheel the combination with an outer flexible tread of an inner structure, a plurality of springs between said outer tread and said inner structure, spring-feet attached to the outer extremities of said springs and having a rocking engagement with said tread, substantially as described.

10. In a wheel the combination with an outer tread comprising a plurality of shoes flexibly connected together, of an inner structure, a plurality of springs between said tread and said inner structure, spring-feet attached to the outer extremities of said springs and bearing upon said shoes, the contact between the said spring-feet and the said shoes being a rocking, or oscillating bearing, and teeth formed in said shoes and said spring-feet adapted to mesh with each other and to allow a rocking movement, substantially as described.

11. In a wheel the combination with an outer flexible tread of an inner structure, and a plurality of helical springs interposed between said tread and said inner structure, a plurality of spirally-grooved lugs or blocks secured to the said inner structure and adapted to engage said springs, and spring-feet adapted to engage the outer extremities of said springs and to bear upon said outer flexible tread, substantially as described.

12. In a wheel the combination with an outer flexible tread of an inner structure, a plurality of helical springs interposed between said tread and said inner structure, spring-feet adapted to bear on said outer flexible tread, and spirally-grooved lugs provided on said spring-feet and adapted to engage with the outer extremities of said springs, substantially as described.

13. In a wheel the combination with an outer flexible tread of an inner structure, helical springs interposed between said tread and said inner structure, spring-feet bearing upon said outer tread, and spirally-grooved lugs upon said inner structure and upon said spring-feet and adapted to hold securely the ends of the said springs, substantially as described.

14. In a wheel having an outer flexible tread, the combination with a plurality of separate shoes provided with hooks of links adapted to engage said hooks and to unite said shoes into a continuous flexible tread for said wheel, substantially as described.

15. In a wheel having an outer flexible tread, the combination with a plurality of separate shoes or bearing-blocks provided with suitable hooks, of a plurality of separate links adapted to engage with the said hooks and to connect the said shoes one to another to form a continuous flexible tread and means for retaining said links in engagement without preventing the flexure of said tread, substantially as described.

16. In a wheel the combination with a rigid inner structure of a universally-flexible outer structure and an outer rim comprising separate shoes linked together to form a continuous tread, substantially as described.

17. In a wheel the combination with a rigid inner structure of a flexible tread and helical springs in transverse rows interposed between said inner structure and said flexible tread, the springs in adjacent rows being in different planes parallel to the plane of the wheel, substantially as described.

18. In a wheel the combination with a rigid inner structure of an outer flexible tread, and springs interposed between said structure and said tread, said tread being composed of separate shoes having sides curved so that they preserve their normal separation from each other in all positions which they can assume, substantially as described.

19. In a wheel the combination with the rigid inner structure $a$, of a rim $b$, bolt $c$, provided with spirally-grooved lug or block $c'$, the feet $e$ provided with spirally-grooved lugs or blocks $e'$, the spring $d$ adapted to engage the lugs or blocks $c'$ and $e'$, the shoe $f$ and the link $g$, substantially as described.

20. In a wheel the combination with the inner rigid structure $a$, of the rim $b$, bolt $c$, provided with the spirally-grooved lug, or block, $c'$, the feet $e$ provided with spirally-grooved lugs or blocks $e'$, the spring $d$ adapted to engage the lugs or blocks $c'$ and $e'$, the shoe $f$ and the link $g$, the stop $f^2$, substantially as described.

21. In a wheel the combination with the inner rigid structure $a$, of a rim $b$, bolt $c$, provided with threaded lug, or block $c'$, the feet $e$ provided with threaded lugs, or blocks $e'$, the spring $d$ adapted to engage the threaded lugs, or blocks $c'$ and $e'$, the shoe $f$ and the link $g$, the stop $f^2$, and the teeth $e^3$ upon the foot engaged with the teeth $f^3$ on the shoe whereby a bearing along one line is afforded between the shoe and foot, substantially as described.

22. In a wheel the combination of an outer flexible tread comprising a plurality of flexibly-connected shoes, of an inner structure, springs interposed between said tread and said inner structure, spring-feet attached to the outer extremities of said springs and bearing upon said shoes, and means for preventing said shoes becoming detached from said spring-feet comprising suitable lips formed in said shoes and suitable projections on said spring-feet, which engage with or hook under said lips.

23. A wheel having an outer tread comprising a plurality of separate shoes or bearing-blocks adapted to bear independently and directly upon the surface traveled over, a single series of connections which flexibly join the said shoes or bearing-blocks one to another, the said connections being adapted to allow free flexure in all directions and also to permit a torsional flexibility which permits any two adjacent shoes so connected to occupy positions in different planes, the said connections forming together with the shoes an endless chain or belt of constant length, an inner structure, and a plurality of springs interposed between said shoes and said inner structure.

In witness whereof I hereunto subscribe my name this 30th day of August, A. D. 1899.

GEORGE K. DAVOL.

Witnesses:
  CHARLES A. BROWN,
  CHARLES E. HUBERT.